United States Patent
Fukuda et al.

(10) Patent No.: US 7,232,627 B2
(45) Date of Patent: Jun. 19, 2007

(54) ELECTRODE FOR SOLID POLYMER FUEL CELL

(75) Inventors: Kaoru Fukuda, Saitama (JP); Masaki Tani, Saitama (JP); Shigeru Inai, Saitama (JP); Hayato Kaji, Saitama (JP); Chikara Iwasawa, Saitama (JP); Shinya Watanabe, Saitama (JP); Katsuhiko Kohyama, Saitama (JP); Hiroshi Shinkai, Saitama (JP); Takeshi Muro, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 648 days.

(21) Appl. No.: 10/703,072

(22) Filed: Nov. 7, 2003

(65) Prior Publication Data
US 2004/0115517 A1    Jun. 17, 2004

(30) Foreign Application Priority Data
Nov. 8, 2002    (JP)    ............................. 2002-325400
Nov. 8, 2002    (JP)    ............................. 2002-325401

(51) Int. Cl.
*H01M 4/00*    (2006.01)
(52) U.S. Cl. ........................... 429/128; 429/40; 429/42
(58) Field of Classification Search ................. 429/40, 429/42, 128
See application file for complete search history.

(56) References Cited

U.S. PATENT DOCUMENTS 6,855,178 B2 *   2/2005   Uchida et al. .............. 29/623.5
6,916,575 B2 *   7/2005   Hori et al. ..................... 429/42

FOREIGN PATENT DOCUMENTS

| EP | 1 288 161 A1 | 3/2003 |
| JP | 8-180879 | 7/1996 |
| JP | 09-199138 A | 7/1997 |
| JP | WO 02/073723 * | 9/2002 |
| JP | 2002-289230 A | 10/2002 |
| JP | 2003-168442 | 6/2003 |
| WO | WO 01/92151 A1 | 12/2001 |

* cited by examiner

Primary Examiner—Dah-Wei Yuan
(74) Attorney, Agent, or Firm—Arent Fox LLP

(57) ABSTRACT

An electrode for a solid polymer fuel cell includes a gas diffusion layer, an electrode catalyst layer disposed between a solid polymer membrane of the fuel cell and the gas diffusion layer, and a water-holding layer disposed between the gas diffusion layer and the electrode catalyst layer. Under high-relative humidity conditions of reaction gases, flooding can be prevented because the electrode catalyst layer is made porous, while under low-relative humidity conditions of reaction gases, sufficient water contents can be stably provided thanks to the water-holding layer so that proton conductivity of the solid polymer membrane can be maintained appropriately. Consequently, high-performance and high-durability electrode and membrane electrode assembly for a solid polymer fuel cell can be provided such that the performance and the durability thereof are not affected by change in relative humidity in reactant gases supplied to the solid polymer fuel cell.

7 Claims, 8 Drawing Sheets

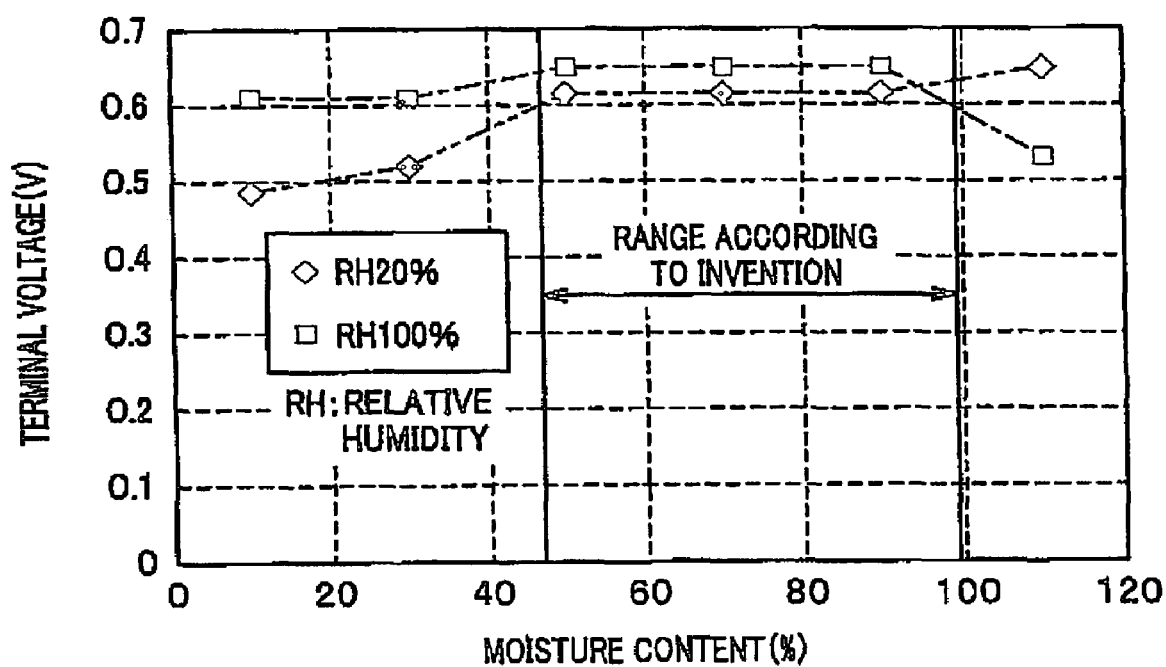

HUMIDIFIED GAS    HUMIDIFIED GAS

HUMIDIFIED GAS

FIG. 7A

|  | MOISTURE CONTENT % (DRY MASS BASE) | TERMINAL VOLTAGE (V) | | | | |
|---|---|---|---|---|---|---|
|  |  | RH20% | RH40% | RH60% | RH80% | RH100% |
| EXAMPLE 1 | 70.5 | 0.618 | 0.625 | 0.642 | 0.655 | 0.648 |
| EXAMPLE 2 | 90.4 | 0.620 | 0.624 | 0.632 | 0.643 | 0.650 |
| EXAMPLE 3 | 48.6 | 0.616 | 0.622 | 0.634 | 0.652 | 0.648 |
| COMPARATIVE EXAMPLE 1 | 88.4 | 0.572 | 0.602 | 0.617 | 0.636 | 0.642 |
| COMPARATIVE EXAMPLE 2 | 112 | 0.646 | 0.636 | 0.596 | 0.552 | 0.529 |
| COMPARATIVE EXAMPLE 3 | 28.3 | 0.523 | 0.556 | 0.575 | 0.592 | 0.608 |
| COMPARATIVE EXAMPLE 4 | 10.2 | 0.490 | 0.523 | 0.573 | 0.596 | 0.610 |

RH : RELATIVE HUMIDITY

FIG. 7B

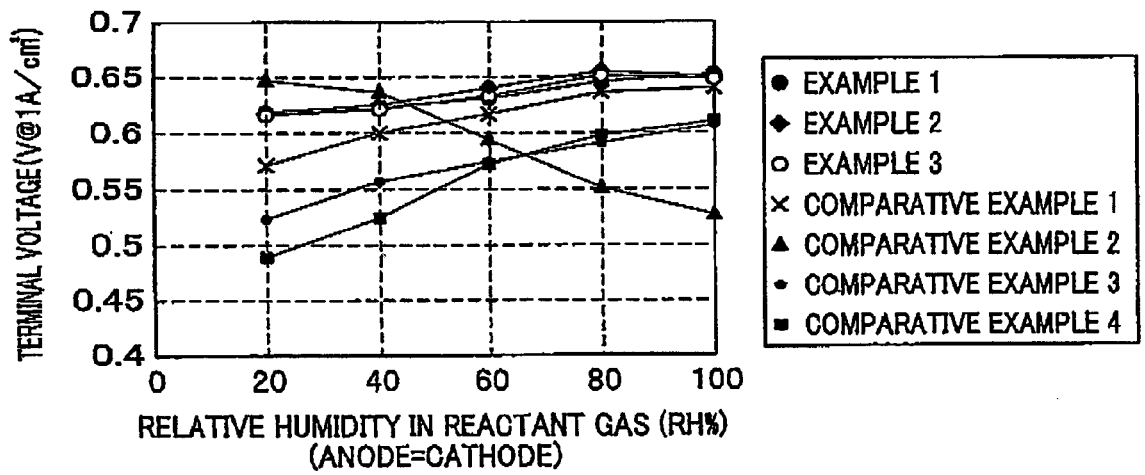

FIG. 7C

|  | RESISTANCE (mΩ) | MOISTURE CONTENT (%) | ADHESION RATE (%) | DIFFERENTIAL PRESSURE (mmaq) | ΔTERMINAL VOLTAGE (mV) |
|---|---|---|---|---|---|
| EXAMPLE 1 | 3.8 | 70.5 | 25 | 90 | 25 |
| EXAMPLE 2 | 4.2 | 90.4 | 25 | 120 | 30 |
| EXAMPLE 3 | 3.6 | 48.6 | 25 | 60 | 28 |
| COMPARATIVE EXAMPLE 1 | 3.6 | 90.4 | 25 | 40 | 50 |
| COMPARATIVE EXAMPLE 2 | 6.8 | 112 | 25 | 160 | 50 |
| COMPARATIVE EXAMPLE 3 | 4.5 | 28.3 | 25 | 20 | 50 |
| COMPARATIVE EXAMPLE 4 | 3.2 | 10.2 | 25 | 40 | 70 |
| COMPARATIVE EXAMPLE 5 | 3.8 | 69.8 | 7 | 90 | 65 |
| COMPARATIVE EXAMPLE 6 | 3.8 | 70.3 | 6 | 90 | 35 |

ELECTRODE FOR SOLID POLYMER FUEL CELL

BACKGROUND OF THE INVENTION

This invention relates to electrodes or membrane electrode assemblies for a solid polymer fuel cell (SPFC; also called "polymer electrolyte fuel cell" or PEFC), and more particularly to an electrode capable of achieving a stabilized power-generation performance even under conditions of unstable humidity in reactant gases supplied to solid polymer fuel cells, and preventing deterioration derived from delayed supply of the reactant gases.

The solid polymer fuel cell has been attracting widespread attention in recent years as being a power source for electric vehicles, and the like. The solid polymer fuel cell can generate electric power at ordinary (sufficiently low) temperatures, and is thus finding various practical applications.

The fuel cell includes an anode and a cathode. The anode is a fuel-gas terminal to which a fuel gas containing hydrogen is supplied. The cathode is an oxidant-gas terminal to which oxidant gas containing oxygen is supplied A chemical reaction then takes place between oxygen in the cathode and hydrogen in the anode, thereby generating electricity. For example, when air is supplied as the oxidant gas to the cathode, chemical energy is converted into electric energy to be supplied to an external load as expressed by the following equations:

At the anode: $2H_2 \rightarrow 4H^+ + 4e^-$

At the cathode: $O_2 + 4H^+ + 4e^- \rightarrow 2H_2O$

Overall; $2H_2 + O_2 \rightarrow 2H_2O$ \hfill (1)

There is a solid polymer membrane (electrolyte membrane) between the anode and the cathode of the fuel cell. Protons generated during reaction in the anode pass through the solid polymer membrane, and travel with moister to the cathode. Electrons generated during the same reaction in the anode are carried through an external circuit to the cathode. The protons and electrons as thus put together in the cathode react with oxygen in the air to make water.

In the solid polymer membrane fuel cell (also called "proton exchange membrane fuel cell" or PEMFC), moisture should be supplied to constantly maintain proton conductivity of the solid polymer membrane (electrolyte membrane), and thus the reactant gases to be supplied to the fuel cell are humidified in advance.

In general, the solid polymer fuel cell has a layered structure as shown in FIG. 6 in which a single cell 100 is schematically illustrated. Onto both sides of a solid polymer membrane 101 are provided electrode catalyst layers 102a, 102b, and on the outsides thereof are provided gas diffusion layers 103a, 103b, to form a membrane electrode assembly (MEA). On both sides of the MEA are then provided separator plates 104a, 104b, which not only serve to separate each cell but also serve as is manifolds to distribute reactant gases such as fuel gases and oxidant gases between and within the cells. The single cell 100 is formed by sandwiching the above layers between the separator plates 104a, 104b and holdings the layered structure from outside the separator plates 104a, 104b. The electrode catalyst layer 102a or 102b and the gas diffusion layer 103a or 103b make up an electrode (anode or cathode).

It is assumed that a shortage of fuel gases encountered during the process as represented by Equation (1) above would cause corrosion of carbon in the gas diffusion layers 103a, 103b, as expressed by Equation (2) as follows:

$2H_2O + C \rightarrow 4H^+ + CO_2\uparrow$ \hfill (2)

If corrosion proceeded as above, catalyst supporting carbon black would be consumed; this would disadvantageously deteriorate the membrane electrode assembly, and eventually deteriorate the fuel cell itself.

Several attempts have been made to prevent such corrosion of carbon from proceeding and to eliminate the resulting disadvantages, mostly with consideration given to the reaction as in Equation (1); for example, Applicant previously has devised an approach of giving water-retaining capability to the electrode catalyst layers (see JP 2003-168442 A). Another approach disclosed in WO 01/15254 A is to add a catalyst for accelerating electrolysis of water to the electrode catalyst layers.

The above existing approaches of giving water-retaining capability or adding a catalyst for accelerating electrolysis of water to the electrode catalyst layers would be effective for a transient shortage of fuel gases, but repeatedly encountered shortages of fuel gases (e.g., due to abrupt acceleration, or the like) which would be assumed in actual driving situations, or rated driving conditions, would disadvantageously result in flooding due to the enhanced water-retaining capability in the electrode catalyst layers. The flooding is a phenomenon in which water is retained in gas diffusion channels such as pores formed in the electrode catalyst layers and inhibits diffusion of gases. Flooding would not only lower the performance of the membrane electrode assembly but also inhibit supply of fuel gases under operating conditions of the fuel cell such that shortages of fuel gases are repeatedly encountered, and would expand a region in which fuel gases are insufficient in the anode, so that corrosion of carbon could proceed, thus decreasing the performance of the membrane electrode assembly.

In order to avoid causing power generation performance of the fuel cell to lower due to flooding within the cell, a pore-making material may be added to form a porous structure of the electrode catalyst layers 102a, 102b which serves to remove water in the cell (see JP 8-180879 A). As the gas diffusion layers 103a, 103b, a porous material having a current-collecting property may be provided on the outsides of the electrode catalyst layers 102a, 102b; for example, carbon paper having a porosity of 80%, etc. may be employed.

The pore-making material added to the electrode catalyst layers 102a, 102b would indeed improve the power generation performance under high-humidity conditions where a plenty of water exists in the cell 100 because the pore-making material in the electrode catalyst layers 102a, 102b would facilitate drainage of water from the electrode catalyst layers 102a, 102b, thus serving to prevent flooding; however, under low-humidity conditions, only adding the pore-making material to the electrode catalyst layers 102a, 102b would rather lead to disadvantageous effects of lowering the power generation performance because water required to maintain proton conductivity of the solid polymer membrane 101 would be drained out through pores formed by adding the pore-making material.

The present invention has been made to address the above-described disadvantages.

SUMMARY OF THE INVENTION

In one aspect of the present invention, there is provided an electrode (and, a membrane electrode assembly) for a solid polymer fuel cell. The electrode comprises: a gas diffusion layer for uniformly diffusing reactant gases; an electrode catalyst layer disposed between a solid polymer membrane of the fuel cell and the gas diffusion layer to support a catalyst for reaction of the diffused reactant gases; and a water-holding layer disposed between the gas diffusion layer and the electrode catalyst layer to enhance a water-retaining capability of the gas diffusion layer. In addition, the electrode catalyst layer is made porous to facilitate drainage of water from the electrode catalyst layer.

With the above arrangement, (1) under high-relative humidity conditions of reaction gases, 'flooding' can be prevented because the electrode catalyst layer is mad porous (e.g., by addition of p re-making materials). Therefore, the fuel cell incorporating an electrode having a structure as above according to the present invention can maintain a high level of power generation performance; and (2) under low-relative humidity conditions of reaction gases, sufficient water contents can be stably provided so that proton conductivity of the solid polymer membrane can be maintained appropriately, because the water-holding layer for enhancing the water-retaining capability of the gas diffusion layer. Therefore, the fuel cell incorporating an electrode having a structure as above according to the present invention can achieve improvement in power generation performance. Moreover, corrosion of carbon, which would otherwise proceed when a shortage of fuel gases is encountered, can be inhibited. Consequently, a high-performance and high-durability electrode and membrane electrode assembly for a solid polymer fuel cell can be provided such that the performance and the durability thereof are not affected by change in relative humidity in reactant gases supplied to the solid polymer fuel cell.

Preferably, the above gas diffusion layer may be configured to have a moisture content ranging between 50% and 90% inclusive. The moisture content is obtained by the following equation:

$$MoistureContent = \frac{SM - DM}{DM} \times 100[\%]$$

where SM denotes mass of the gas diffusion layer under saturation of water vapor pressure; and DM denotes mass of the gas diffusion layer under dry conditions. By limiting the moisture content of the gas diffusion layer within the preferable range as above, deterioration of the electrode (or membrane electrode assembly) due to shortage of fuel gases can be prevented. To be more specific, flooding caused by an excessive moisture content of the gas diffusion layer can be prevented, and corrosion of carbon in the electrode (or membrane electrode assembly) caused by an insufficient moisture content of the gas diffusion layer can also be prevented.

Moreover, the gas diffusion layer may be configured to have a desirable range of a differential pressure of the reactant gases. The differential pressure can be calculated from two pressures measured at places upstream and downstream of the gas diffusion layer when a predetermined flow rate of the reactant gases pass through the gas diffusion layer. The desirable differential pressure ranges between 60 mmH$_2$O and 120 mmH$_2$O inclusive. Assuming that the moisture content of the gas diffusion layer were kept constant, change in differential pressure of reactant gases across the upstream and downstream of the gas diffusion layer would greatly affect the power generation performance associated with the change in relative humidity of the reactant gases. In this respect, by limiting the differential pressure to a desirable range as above, stable power generation performance of the fuel cell can be ensured regardless of change in relative humidity of the reactant gases, and deterioration of the electrode is (or membrane electrode assembly) due to shortage of fuel gases can be prevented. To be more specific, flooding caused by an excessive differential pressure of the gas diffusion layer can be prevented, and corrosion of carbon in the electrode (or membrane electrode assembly) caused by an insufficient differential pressure of the gas diffusion layer can be prevented.

The electrode may further include a water-repellent layer provided between the water-holding layer and the gas diffusion layer to facilitate drainage of water from the gas diffusion layer. More specifically, the electrode catalyst layer may include a catalyst, a carbon powder for supporting the catalyst, an ion conductive polymer and a crystalline carbon fiber. Further, the gas diffusion layer may include, in sequence from an electrode catalyst layer side: a water-repellent layer containing an ion conductive polymer, a carbon powder and a crystalline carbon fiber; and a carbon cloth layer. Thus-provided water-repellent layer serves to facilitate drainage of condensed water in the porous gas diffusion layer in which humidified reactant gases supplied from a separator plate of the fuel cell are diffused and transferred to the water-holding layer disposed between the gas diffusion layer and the electrode catalyst layer, such that water can be supplied for a relatively short time from the gas diffusion layer to the water-holding layer. Accordingly, proton conductivity of the solid polymer membrane can be maintained with sufficient water supplied through the water-holding layer. Consequently, the power generation performance can be improved, and corrosion of carbon due to a shortage of fuel gases can be prevented from proceeding in the cell.

In the membrane electrode assembly for the solid polymer fuel cell according to the present invention, a percentage of a charge amount of catalytic substances existing on an interface between the solid polymer membrane and the electrode catalyst layer to a charge amount of all catalytic substances existing in the electrode catalyst layer may preferably be 15% or greater. Hereupon, the charge amounts may be determined by a cyclic voltammetry. The above percentage of the charge amount determined by the cyclic voltammetry is an indicator of an adhesion rate between the solid polymer membrane and the electrode catalyst layer. If the percentage is 15% or greater (i.e. the adhesion rate is sufficiently high), decrease in the amount of water reversely diffused from the cathode as a result of insufficient adhesion rate can be prevented, and thus corrosion of carbon which would otherwise proceed can be prevented in the fuel cell.

Other objects and further features of the present invention will become readily apparent from the following description of preferred embodiments with reference to accompanying drawings.

BRIEF DESCRIPTION OF THE DRAWINGS

FIG. 3 is a graph showing a relationship between a moisture content of a gas diffusion layer of an electrode according to a third embodiment of the present invention and a terminal voltage of a single cell.

FIG. 7A is a table showing measurements of terminal voltages of a single cell using an electrode of Examples 1 through 3 and Comparative examples 1 through 4.

FIG. 7B is a graph showing the measurements of FIG. 7B where x-axis denotes a relative humidity of reactant gases, and y-axis denotes a terminal voltage of a single cell with a current density of 1 A/cm$^2$.

FIG. 7C is a table showing measurements of differences between terminal voltages ("Δ terminalvoltage") of a single cell exhibited before and after an endurance test using an electrode of Examples 1 through 3 and Comparative examples 1 through 6.

DETAILED DESCRIPTION OF THE PREFERRED EMBODIMENTS

A description will be given of exemplary embodiments of the present invention with reference to the drawings.

General Structure: First Embodiment

First of all, an exemplified general structure of a single cell of a solid polymer fuel cell including an electrode (and membrane electrode assembly) according to the present invention will be described as a first embodiment of the present invention with reference to FIG. 1.

Figure 1:
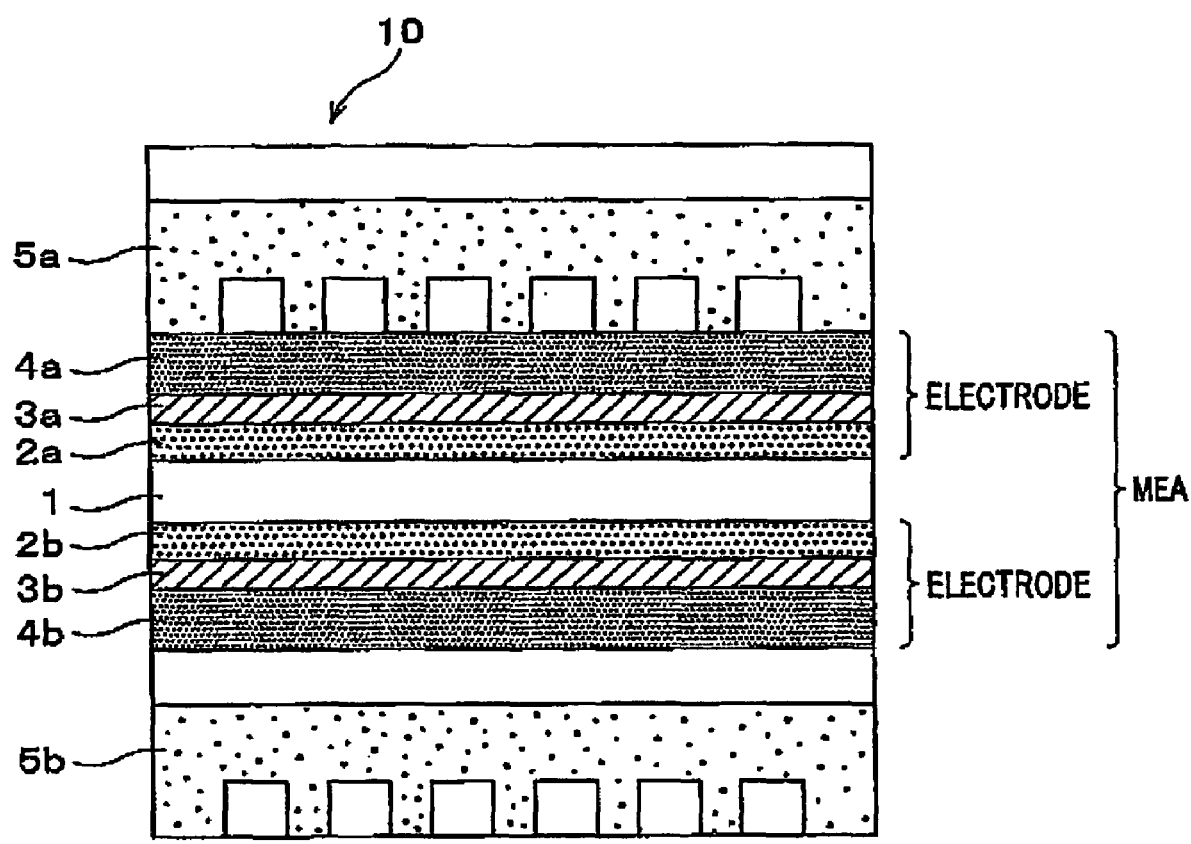
FIG. 1 is a schematic diagram of a single cell of a solid polymer fuel cell including an electrode according to one exemplified embodiment of the present invention.

The single cell 10 of the solid polymer fuel cell includes, as shown in FIG. 1, a solid polymer membrane 1, and disposed at both sides of the solid polymer membrane 1 are electrode catalyst layers 2a, 2b, water-holding layers 3a, 3b, and gas diffusion layers 4a, 4b in this order. These components 4a, 3a, 2a, 1, 2b, 3b, 4b make up a membrane electrode assembly (MEA). The single cell 10 further includes separator plates 5a, 5b which are disposed at both sides of the MEA and serve to separate the MEA from MEAs of other cells adjacent to the cell 10 and to provide channels for supplying reactant gases (fuel gases and oxidant gases). In other words, there is provided a pair of electrodes each include the gas diffusion layer 4a (4b), the water-holding layer 3a (3b) and the electrode catalyst layer 2a (2b), and the solid polymer membrane 1 is disposed between the electrodes. In the electrode, the electrode catalyst layer 2a (2b) is disposed between the solid polymer membrane 1 and the gas diffusion layer 4a (4b), and the water-holding layer 3a (3b) is disposed between the gas diffusion layer 4a (4b) and the electrode catalyst layer 2a (2b). The solid polymer membrane 1 is sandwiched between the electrodes to form an MBA, and the MEA is sandwiched by the separator plates 5a, 5b to form a principal structure of the cell 10.

The solid polymer membrane 1 is an electrolyte membrane having ion conductivity. In particular, perfluorosulfonic acid polymer membrane may be employed, which are sold under brand names such as Nafion®, Flemion®, Aciplex®, etc. In the present embodiment, Nafion® manufactured by E. I. du Pont de Nemours and Company is employed. In order to have sufficient proton conductivity exerted in the solid polymer membrane, the membrane should retain a sufficient amount of water. However, protons are hydrated in the membrane, and water is transferred from the anode to the cathode by electroendosmosis. Thus, electrolysis at the electrode, especially at the anode, is likely to dry. Accordingly, reactant gases supplied through the separator plates 5a, 5b are humidified in advance so as not to allow the solid polymer membrane 1 to dry.

The electrode catalyst layers 2a, 2b contain a catalyst, and the catalyst for fuel gases and the catalyst for oxidant gases are different in metal content. The catalyst most used for both fuel gases and oxidant gases is platinum (Pt), but if carbon monoxide could be included in the gases, poison-inhibitive metal is added to the platinum because carbon monoxide would poison a platinum-based catalyst. In the present embodiment, a platinum-based catalyst in which platinum is supported by carbon black (carbon powders) is used in the electrode for oxidant gases, and a catalyst in which platinum and ruthenium are supported by carbon black is used in the electrode for fuel gases. The electrode catalyst layers 2a, 2b may further include an ion conductive polymer such as polytetrafluoroethylene copolymers, perfluorosulfonic acid polymers or the like. In the present invention, Nafion® is employed for the ion conductive polymer. Moreover, a pore-making material PM is further added to the mixture of the ion conductive polymer and the catalyst-supporting carbon powder to make the layers porous and to thereby facilitate drainage of water from the electrode catalyst layers 2a, 2b. Any known materials usable as the pore-making material may be used for giving a desired porous structure to the electrode catalyst layers 2a, 2b, and a crystalline carbon fiber is added as the pore-making material in the present embodiment. It is however to be understood that the electrode catalyst layers 2a, 2b according to the present invention are not limited to the above composition.

The water-holding layers 3a, 3b are made by adding a pore-making material PM to an ion conductive polymer, and possess high water-retaining capability. In general, the ion conductive polymer applicable thereto may be prepared by placing polytetrafluoroethylene copolymer, polypyrrole, polyaniline, or the like into a dispersion medium to form colloidal particles. Among usable materials for the pore-making material PM are carbon, methyl cellulose, carboxyl methyl cellulose, polyvinyl alcohol, cellulose, polysaccharide, and other organic materials. In the present embodiment, the pore-making material for the water-holding layers 3a, 3b is prepared by mixing a carbon black powder with a crystalline carbon fiber. It is however to be understood that the water-holding layers 3a, 3b according to the present invention are not limited to the above composition as far as the composition can exert a desirable water-retaining capability.

For the gas diffusion layers 4a, 4b, a porous, current-collecting, and physical support layer, e.g., carbon paper (having approximately 80% porosity) may preferably be used. In the present embodiment, Teflon® (polyfluoroethylenepropylene) in which carbon black powers are dispersed is applied to carbon paper, to form the gas diffusion layers 4a, 4b.

The separator plates 5a, 5b include grooves serving as channels for distributing reactant gases. The separator plates 5a, 5b may be made of carbon or metal of various kinds, one or more materials may be selected as appropriate and used singly or in combination to meet the particular purposes.

The electrode and membrane electrode assembly having the above-described structure according to the first embodiment of the present invention exert the following advantageous features:

(1) Addition of a pore-making material PM to the electrode catalyst layers 2a, 2b to facilitate drainage of water from the electrode catalyst layers 2a, and 2b makes it possible to prevent flooding even under conditions in which reactant gases exhibit high relative humidity. Thus, the fuel cell having the electrode according to the present invention can maintain as high power generation performance as could be achieved in the fuel cell unless affected by flooding.

(2) Provision of the water-holding layer 3a (3b) for enhancing a water-retaining capability of the gas diffusion layer 4a (4b) between the electrode catalyst layer 2a (2b) and the gas diffusion layer 4a (4b) allows the gas diffusion layers 3a, 3b to always hold water (moisture content) enough to maintain a sufficient level of proton conductivity of the solid polymer membrane 1. Thus, even under conditions where shortages of fuel gases are encountered frequently, corrosion of carbon can be prevented from proceeding in the catalyst electrode layers 2a, 2b of the membrane electrode assembly MEA. Accordingly, the fuel cell having the electrode according to the present invention can exert improved power generation performance and durability.

Consequently, according to the present embodiment, an electrode and membrane electrode assembly for a solid polymer fuel cell having a stable power generation performance and high durability such that the performance and the durability thereof are not affected by change in relative humidity in reactant gases supplied to the solid polymer fuel cell.

Second Embodiment

Figure 2:
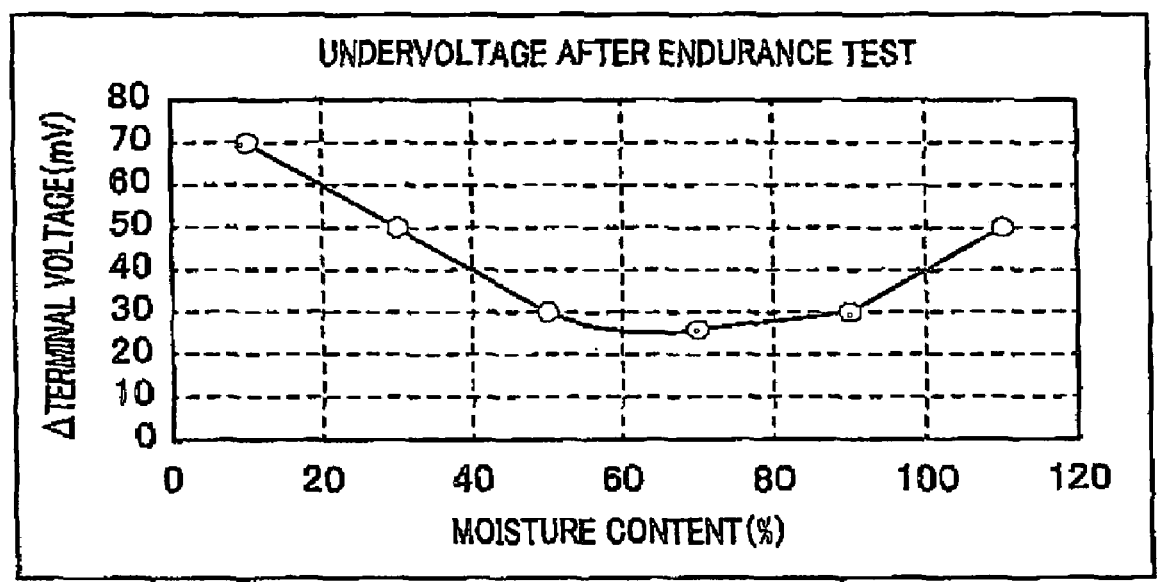
FIG. 2 is a graph showing a relationship between a moisture content of a gas diffusion layer of an electrode according to a second embodiment of the present invention and an undervoltage (difference between terminal voltages; "Δ terminal voltage") of a single cell exhibited before and after an endurance test.

Next, a description will be given of a second embodiment of the electrode and membrane electrode assembly according to the present invention which includes a gas diffusion layer having optimum moisture content with reference to FIG. 2. FIG. 2 is a graph showing a relationship between a moisture content of a gas diffusion layer of an electrode according to the second embodiment of the present invention and an undervoltage (difference between terminal voltages; "Δ terminal voltage") of a single cell exhibited before and after an endurance test.

In FIG. 2, the abscissa denotes moisture content (mass %), percentage of moisture content of the gas diffusion layer relative to mass of the gas diffusion layer under dry conditions, and the ordinate denotes a difference between terminal voltages (Δ terminal voltage) of a single cell obtained before and after the endurance test. That is, the moisture content is given by Equation (3):

$$MoistureContent = \frac{SM - DM}{DM} \times 100 [\%] \quad (3)$$

where SM denotes mass of the gas diffusion layer under saturation of water vapor pressure; DM denotes mass of the gas diffusion layer under dry conditions.

[Endurance Test]

Figure 8:
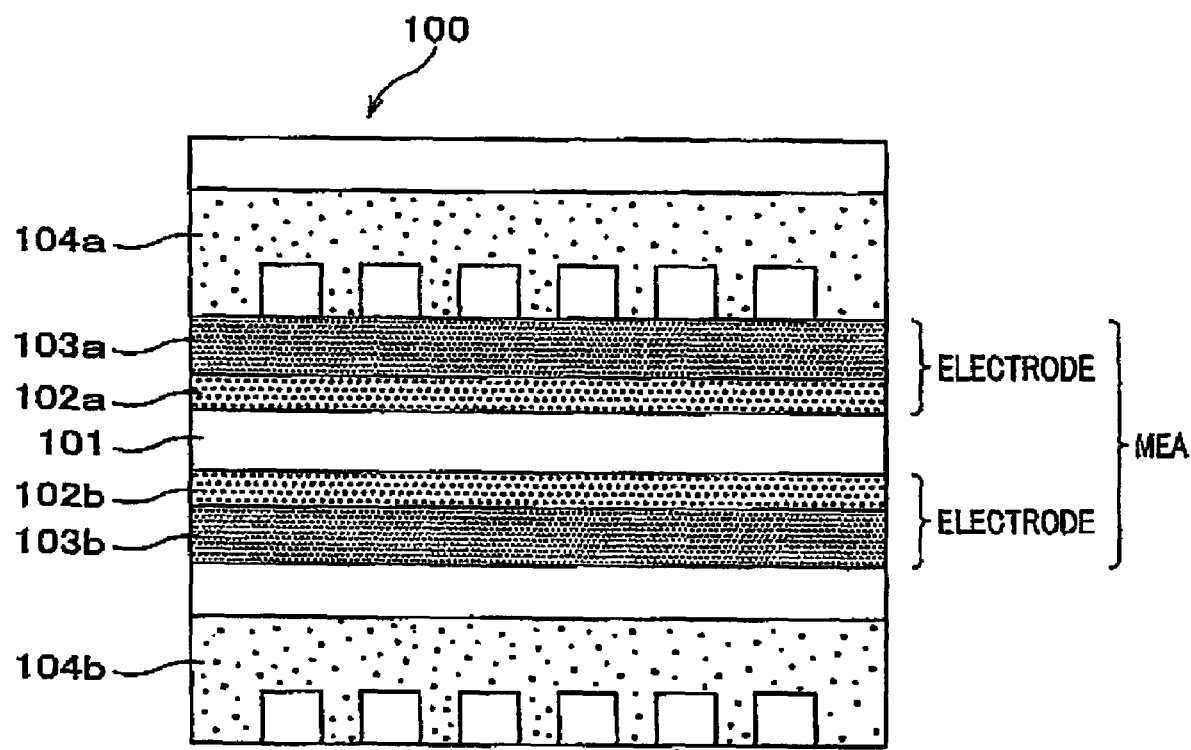
FIG. 8 is a schematic diagram of a single cell of a solid polymer fuel cell including an electrode of a conventional type.

The endurance test was carried out in a mower as follows:

First, electric current and voltage performance of a fuel cell embodying the present invention as shown in FIG. 1 and a fuel cell as shown in FIG. 8 prepared for comparison are measured. Subsequently, an endurance test under transient hydrogen-deficient conditions (load test) was conducted. In the endurance test under transient hydrogen-deficient conditions, current applied to the fuel cell were fluctuated between 0 A/cm$^2$ and 1 A/cm$^2$ at regular intervals for 200 hours. The interval of fluctuation was 20 seconds from 0 A/cm$^2$ to 1 A/cm$^2$, and 1 A/cm$^2$ to 0 A/cm$^2$. The amount of gases supplied to the anode and the cathode are configured so that the average utilization rates thereof exhibit 200% and 50%, respectively. The difference between terminal voltages exhibited before and after the aforementioned endurance test is employed as Δ terminal voltage as shown in FIG. 2. It is understood that the increase in Δ terminal voltage indicates the deterioration in performance of the membrane electrode assembly. Hereupon, a practical range of the Δ terminal is determined as 30 mV or lower.

[Measuring Moisture Contents]

The moisture contents of the gas diffusion layer were measured in a manner as follows:

(1) A gas diffusion layer having predetermined dimensions and mass are put into a moisture content measuring instrument, (2) The vapor pressure is varied, and the gas diffusion layer is left until the mass becomes unchanged for each vapor pressure.

(3) A mass of the gas diffusion layer having a stable mass under a specific vapor pressure is measured using an electronic balance, and a moisture content of the gas diffusion layer for each vapor pressure is obtained by Equation (3).

(4) a sample of the gas diffusion layer having the predetermined dimensions and mass is put into a thermo-humidistat chamber, left for one hour, and taken out of the chamber. Water is wiped off the sample and then the sample is weighed in the electronic balance; a moisture content of the sample is obtained by Equation (3).

As shown in FIG. 2, in a range of the moisture content up to 50%, the lower the moisture content, the higher the Δ terminal voltage becomes gradually. This indicates that as the moisture content in the gas diffusion layer decreases, drainage of water is accelerated to such an extent that only the electrolysis of water cannot produce sufficient hydrogen ion to be supplied to the electrode catalyst layer, thus causing corrosion of carbon to proceed in the electrode catalyst layer. On the other hand, in a range of the moisture content beyond 90%, the higher the moisture content, the higher the Δ terminal voltage becomes gradually. This is because the increase of the moisture content over 90% causes flooding to occur, which lowers the capability of supplying reactant gases, thus expanding a region in which fuel gases are insufficient.

In contrast, it is shown that in a range of the moisture content between 50% and 90%, the Δ terminal voltage is stably maintained at a sufficiently low level.

From the foregoing, the electrode or membrane electrode assembly according to the second embodiment of the present invention which basically has the same structure as described in the first embodiment with reference to FIG. 1 includes a gas diffusion layer having a preferable moisture content ranging between 50% and 90% inclusive.

Third Embodiment

Next, a description will be given of a third embodiment of the electrode and membrane electrode assembly according to the present invention with reference to FIG. 3. The difference in structure of the electrode according to the third embodiment from the electrode according to the first and second embodiments is in a water-repellent layer (not shown) for facilitating drainage of water from the gas diffusion layer, which water-repellent layer is provided between the water-holding layer and the gas diffusion layer. The water-repellent layer is formed by mixing Teflon ® dispersed solution with carbon black powders. To be more specific, the electrode according to the third embodiment includes an electrode catalyst layer, a water-holding layer, a water-repellent layer, and a gas diffusion layer; among these components, the gas diffusion layer is targeted for moisture-content adjustment so that a stable power generation performance can be achieved.

A relationship between a moisture content of the gas diffusion layer of the electrode and a terminal voltage of a single cell is graphically shown in FIG. 3. Hereupon, the abscissa denotes a moisture content (mass %), i.e., percentage relative to the dry mass of the gas diffusion layer; and the ordinate denotes a terminal voltage of the single cell. The moisture contents of the gas diffusion layer were measured in the same manner and calculated by Equation (3) as in the second embodiment.

As shown in FIG. 3, with the electrode according to the present embodiment, the power generation performance of the cell comes as follows:

(1) The terminal voltage of the cell represented when a relative humidity of reactant gases is as high as 100% is higher than that represented when the relative humidity is as low as 20%.

(2) If the electrode includes no water-repellent layer and/or water-holding layer and the moisture content of the gas diffusion layer is lower than 50%, then a desired level of the terminal voltage (i.e., 0.6V)-cannot be derived from the cell.

(3) On the other hand, if the cell includes a water-holding layer containing no pore-making material and the moisture content of the gas diffusion layer is higher than 90%, then a desired level of the terminal voltage can still be derived from the cell. However, if the relative humidity of reactant gases is as high as 100%, then failure to add a pore-making material to the water-holding layer leads to insufficient drainage of water, and makes water stagnant in the cell, thereby lowering the terminal voltage. Consequently, the power generation performance is affected badly.

(4) If the moisture content of the gas diffusion layer ranges between 50% and 90%, i.e., the electrode is provided with both of the water-holding layer and the water-repellent layer, then stable power generation performance unsusceptible to change in humidity can be achieved irrespective of whether or not the relative humidity varies in reactant gases.

Fourth Embodiment

Next, a description will be given of a fourth embodiment of the electrode and membrane electrode assembly according to the present invention with reference to FIGS. 4A through 4C. Unlike the electrodes according to the second and third embodiments of the present invention in which the moisture content of the gas diffusion layer is adjusted appropriately to stably achieve an adequate level of power generation performance, the fourth embodiment of the electrode is configured to adjust a differential pressure of reactant gases calculated from two pressures measured at places upstream and downstream of the gas diffusion layer to a specific range, i.e., between 60 mmH$_2$O and 120 mmH$_2$O inclusive, so that an adequate level of power generation performance can be stably achieved.

Figure 4A:
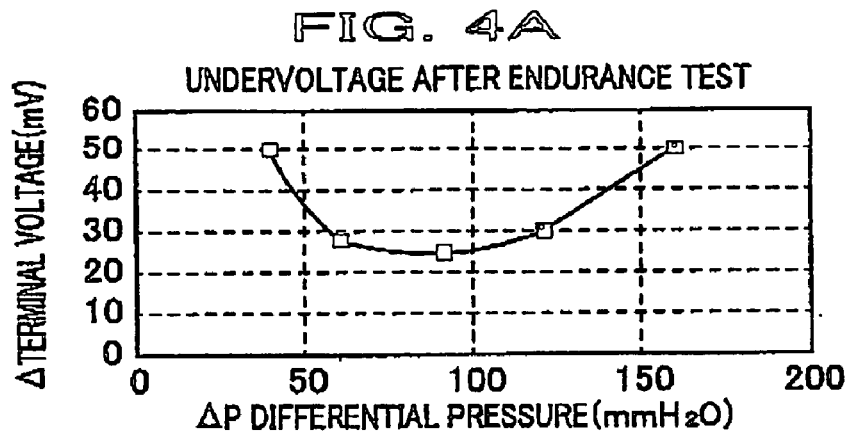
FIG. 4A is a graph showing a relationship between a differential pressure of reactant gases calculated from two pressures at places upstream and downstream of a gas diffusion layer of an electrode according to a fourth embodiment of the present invention and an undervoltage (difference between terminal voltages; "Δ terminal voltage") of a single cell exhibited before and after an endurance test.

FIG. 4A is a graph showing a relationship between a differential pressure of reactant gases calculated from two pressures at places upstream and downstream of the gas diffusion layer and an undervoltage (difference between terminal voltages; "Δ terminal voltage") of a single cell exhibited before and after an endurance test. FIG. 4B is a graph showing a relationship between a differential pressure of reactant gases calculated from two pressures at places upstream and downstream of the gas diffusion layer and an undervoltage (difference between terminal voltages; "Δ terminal voltage") of a single cell exhibited with relative humidity of the reactant gases at 100% and 20%. FIG. 4C is a diagram for explaining a method of measuring the differential pressure. As shown in FIG. 4C, the differential pressure ΔP of the gas diffusion layer can be determined by comparing two pressures measured at places upstream and downstream of the gas diffusion layer when a predetermined flow rate (e.g. 500 L/cm$^2$/min.) of the reactant gases pass through the gas diffusion layer.

As seen from FIG. 4A, in a range of the differential pressure ΔP below 60 mmH$_2$O, the lower the differential pressure ΔP, the higher the Δ terminal voltage becomes. In this range, the gas diffusion layer has water-draining capability enhanced too much to supply hydrogen ion only through the electrolysis of water, and thus corrosion of carbon proceeds. On the other hand, in a range of the differential pressure ΔP beyond 120 mmH$_2$O, the higher the differential pressure ΔP, the lower the gas supplying capability becomes due to flooding, thus expanding a region in which fuel gases are insufficient. In contrast, in a range of the differential pressure ΔP between 60 mmH$_2$O and 120 mmH$_2$O inclusive, the Δ terminal voltage is stably maintained at a low level.

It is understood that a larger value of the Δ terminal voltage indicates a larger difference between terminal voltages before and after the endurance test as described above; therefore, the magnitude of the Δ terminal voltage indicates the degree of undervoltage of the terminal voltage, i.e., decrease in output of the solid polymer fuel cell.

Figure 4B:
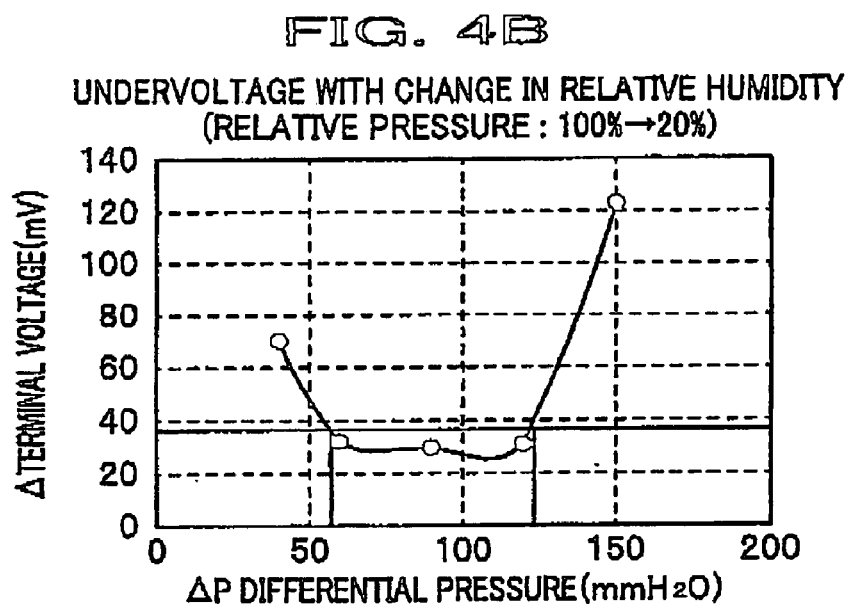
FIG. 4B is a graph showing a relationship between a differential pressure of reactant gases calculated from two pressures at places upstream and downstream of a gas diffusion layer of an electrode according to a fourth embodiment of the present invention and an undervoltage (difference between terminal voltages; "Δ terminal voltage") of a single cell exhibited with relative humidity of the reactant gases at 100% and 20%.
Figure 4C:
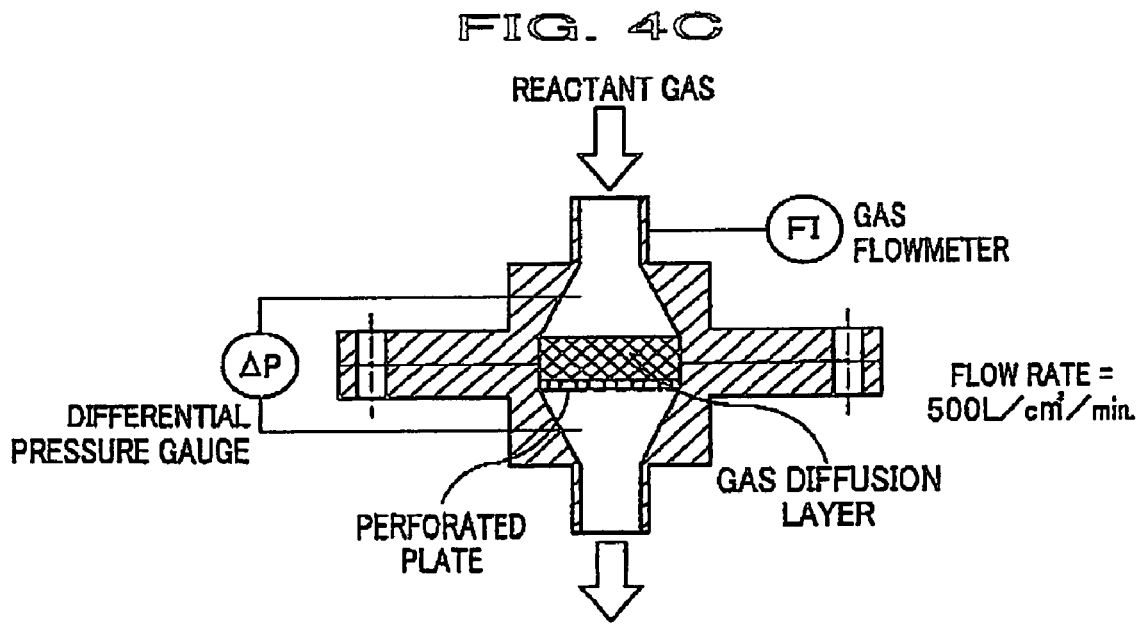
FIG. 4C is a diagram for explaining a method of measuring the differential pressure for use in the fourth embodiment of the present invention.

Turning to FIG. 4B, the influence of change in relative humidity will be described below. In FIG. 4B, the abscissa denotes a differential pressure of reactant gases calculated from two pressures at places upstream and downstream of the gas diffusion layer, and the ordinate denotes a difference between terminal voltages ("Δ terminal voltage") of a single cell exhibited with relative humidity of the reactant gases at 100% and 20%.

As shown in FIG. 4B, with the electrode according to the present embodiment, the power generation performance of the cell comes as follows:

(1) In a range of the differential pressure ΔP of the gas diffusion layer lower than 6 mmH$_2$O, if the amount of pre-making material added to the water-holding layer is much, the water-retaining capacity becomes little. Therefore, 20% relative humidity of reactant gases cannot serve to maintain the ion conductivity of the solid polymer membrane, and thus the difference between terminal voltages ("Δ terminal voltage") exhibited with relative humidity of the reactant gases at 100% and 20% becomes greater.

(2) On the other hand, in a range of the differential pressure ΔP of the gas diffusion layer higher than 120 mmH$_2$O, failure to add a pore-making material to the water-holding layer leads to insufficient drainage of water, and makes water stagnant in the cell, thereby causing flooding in the cell. Consequently, the difference between terminal voltages ("Δ terminal voltage") associated with change in relative humidity of the reactant gases becomes greater.

(3) If the differential pressure ΔP of the gas diffusion layer ranges between 60 mmH$_2$O and 120 mmH$_2$O inclusive, the difference between terminal voltages ("Δ terminal voltage") exhibited with relative humidity of the reactant gases at 100% and 20% can be maintained within a preferable range, i.e., 35 mV or lower. Accordingly, stable power generation performance unsusceptible to change in humidity can be achieved irrespective of whether or not the relative humidity varies in reactant gases.

From the foregoing, the electrode or membrane electrode assembly according to the fourth embodiment of the present invention which basically has the same structure as described in the first embodiment with reference to FIG. 1 includes a gas diffusion layer exhibiting a preferable differential pressure of the reactant gases calculated from two pressures measured at places upstream and downstream of the gas diffusion layer when a predetermined flow rate of the reactant gases pass through the gas diffusion layer ranging between 60 mmH$_2$O and 120 mmH$_2$O inclusive.

<Fifth Embodiment>

Figure 5:
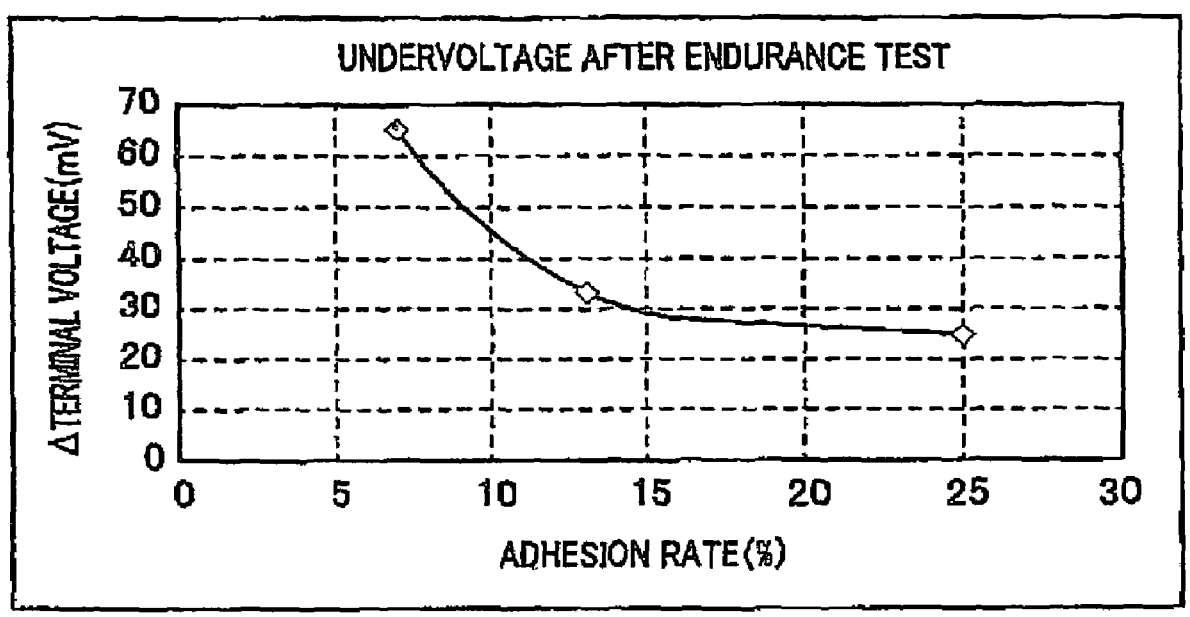
FIG. 5 is a graph showing a relationship between an adhesion rate of a solid polymer membrane and electrode catalyst layer of a membrane electrode assembly according to a fifth embodiment of the present invention and an undervoltage (difference between terminal voltages; "Δ terminal voltage") of a single cell exhibited before and after an endurance test.
Figure 6A:
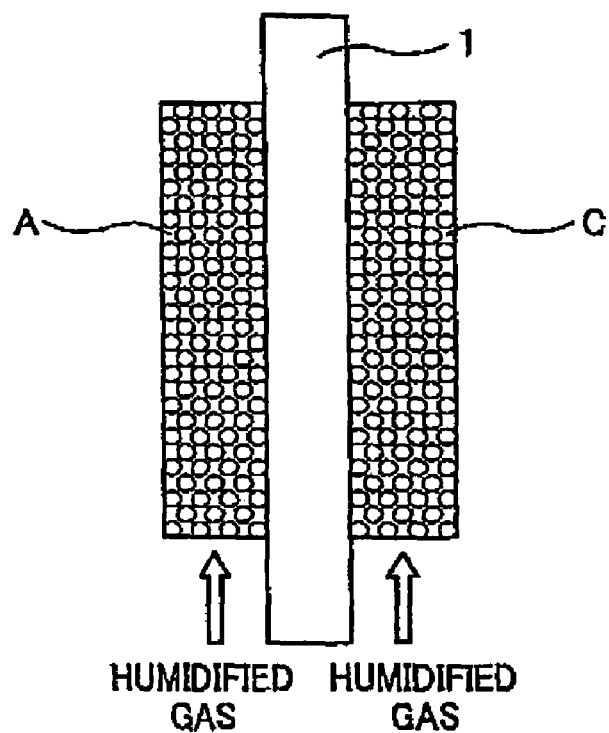
FIGS. 6A and 6B are schematic diagrams for explaining a method of measuring a charge amount of an electrochemical surface existing in an electrode catalyst layer by a cyclic voltammetry.
Figure 6B:
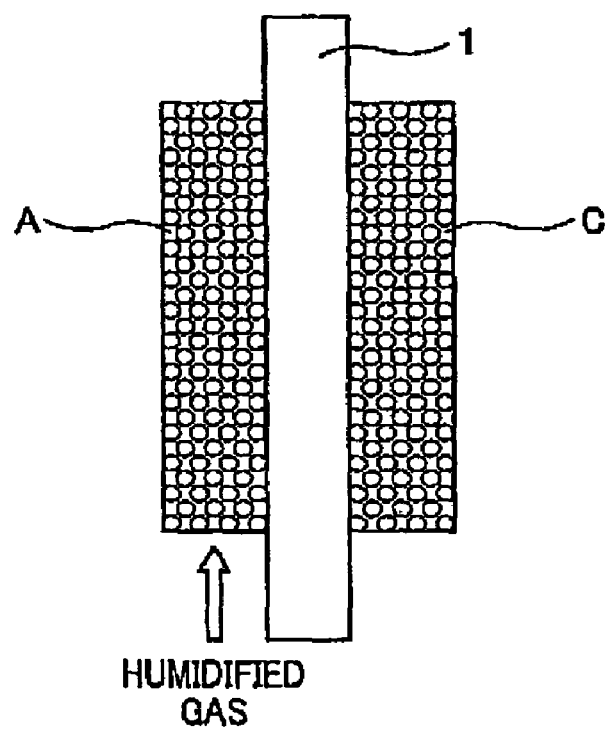

Next, a description will be given of a fifth embodiment of the membrane electrode assembly according to the present invention with reference to FIGS. 5, 6A and 6B. FIG. 5 is a graph showing a relationship between an adhesion rate of a solid polymer membrane and electrode catalyst layer and an undervoltage (difference between terminal voltages; "Δ terminal voltage") exhibited before and after the endurance test as in the second embodiment. FIGS. 6A and 6B are schematic diagrams for explaining a method of measuring a charge amount of an electrochemical surface existing in the electrode catalyst layer by a cyclic voltammetry.

The membrane electrode assembly provided as the fifth embodiment of the present invention basically has the same structure as described in the first embodiment with reference to FIG. 1, and has a preferable adhesion rate of the solid polymer membrane 1 and electrode catalyst layers 2a, 2b, i.e., a percentage of a charge amount of catalytic substances existing on an interface between the solid polymer membrane 1 and the electrode catalyst layer 2a (2b) to a charge amount of all catalytic substances existing in the electrode catalyst layer 1 is configured to be 15% or greater. Hereupon, the above charge amounts used to determine the adhesion rate are measured by the cyclic voltammetry, which will be described in detail below with reference to FIGS. 6A and 6B.

As shown in FIG. 6A, first, by means of a typical process of the cyclic voltammetry, a charge amount of all the catalytic substances existing in the electrode catalyst layers of the electrodes is measured. More specifically, humidifying gases are supplied to the anode A and the cathode C until water is distributed throughout the whole cell; then, a charge amount of electrochemical surfaces of all catalyst particles is measured.

Next, as shown in FIG. 6B, humidifying gases are supplied to the anode A only, and a charge amount of electrochemical surfaces of the catalyst particles is measured. When only the anode A is humidified, water transferred from the anode A is distributed only to conducting channels at a cathode A side of the solid polymer membrane 1. Accordingly, electrochemical surfaces of catalysts existing on an interface between the solid polymer membrane and the electrode catalyst layer, i.e., a charge amount thereof can be evaluated.

The adhesion rate used in the present embodiment can be given by Equation (4) below:

$$AdhesionRate = \frac{SC}{TC} \times 100[\%] \qquad (4)$$

where SC denotes a charge amount of catalytic substances existing on an interface between the solid polymer membrane and the electrode catalyst layer, and TC denotes a charge amount of all catalytic substances existing in the electrode catalyst layer.

The more the amount of catalysts existing on the interface between the solid polymer membrane and the electrode catalyst layer (L e., the higher the adhesion rate), the more efficiently the catalysts can be utilized.

As shown in FIG. 5, in a range of the adhesion rate below 15%, as the adhesion rate increases, the Δ terminal voltage sharply drops, and then (in a range of the adhesion rate of 15% or higher) the Δ terminal voltage gradually decreases. To be more specific, in a range of the adhesion rate below 15%, a reverse diffusion amount of water generated at the cathode side decreases, and thus hydrogen ion cannot sufficiently be supplied only through the electrolysis of water. Therefore, corrosion of carbon proceeds in the electrode catalyst layer. On the other hand, in a range of the adhesion rate of 15% or higher, this phenomenon does not take place; thereby sufficient durability can be maintained.

OPERATIVE EXAMPLES

Next, to verify the facts acquired from the above-discussed first through fifth embodiments, a description will now be given of specific examples of the electrodes and membrane electrode assemblies with reference to FIGS. 7A-7C.

First, a method of fabricating components or layers constituting a single sell of the solid polymer fuel cell prepared in the following examples will be described (1) Electrode Catalyst Layer 1-a) Fabrication of Cathode (Oxidant Gas Terminal)

Crystalline carbon fiber (VGCF; manufactured by Showa Denko Kabushiki Kaisha) is mixed with ion conductive polymer (Nafion®, SE20192; manufactured by E. I. du Pont de Nemos and Company) 35 g and platinum supporting carbon powders (TEC10E50E; manufactured by Tanaka Kikinzoku Kogyo Kabushild Kaisha) 2.5 g with mass ratio of carbon black to platinum being 50:50 to form a catalyst paste for the cathode. The catalyst paste is applied to a FEP (fluoroethylene propylene tetrafluoroethylene-hexafluoro propylene copolymer) sheet so that the amount of platinum on the FEP sheet is 0.3 mg/cm$^2$. The FEP to which the catalyst paste is applied is then dried to form an electrode catalyst layer sheet CA.

1-b) Fabrication of Anode (Fuel Gas Terminal)

Ion conductive polymer Nafion®, SE20192; manufactured by E. I. du Pont de Nemours and Company) 36.8 g and platinum/ruthenium supporting carbon powders (TEC61E54; manufactured by Tanaka Kiknzoku Kogyo Kabusfild Kaisha) 10 g with mass ratio of carbon black to Pt—Ru catalyst being 1:1 are mixed together to form a catalyst paste for the anode. The catalyst paste is applied to a FEP (fluoroethylene propylene tetrafluoroethylene-hexafluoropropylene copolymer) sheet so that the amount of platinum on the PEP sheet is 0.15 mg/cm$^2$. The PEP to which the catalyst paste is applied is then dried to form an electrode catalyst layer sheet AN.

The electrode catalyst layer sheet CA and the electrode catalyst layer sheet AN are transferred to and bot pressed with a solid polymer membrane (electrolyte membrane) to form a membrane electrode assembly (MEA in a broad sense of the term) according to the present invention.

EXAMPLE 1

A water-holding layer is formed using a paste for a water-holding layer prepared by mixing crystalline carbon fiber (VCEF; manufactured by Showa Denko Kabushiki Kaisha) 2.5 g with ion conductive polymer (Nafion®SE20192; manufactured by E. I. du Pont de Nemours and Company) 25 g, and carbon black powders (Ketjen Black; manufactured by Cabot Corporation) 5 g.

A water-repellent layer is formed using a paste for a water-repellent layer prepared by mixing carbon black powders Vulcan XC75, manufactured by Cabot Corporation) 18 g with Teflon® (polyfluoroethylenepropylene) dispersed solution (L170J; manufactured by Asahi Glass Co. Ltd.) 12 g.

Next, 2.3 mg/cm$^2$ of the above paste for a water-repellent layer is applied to carbon paper (TGPO60; manufactured by Toray Industries, Inc.) rendered water repellent in advance to form a gas diffusion layer (with water-repellent layer), and 0.3 mg/cm$^2$ of the paste for a water-holding layer is applied to the gas diffusion layer.

Lastly, between two gas diffusion layers coated with the water-holding layer are disposed the above MEA to form a membrane electrode assembly (MEA) for a single cell as defined in the present invention.

EXAMPLE 2

A single cell was fabricated by the same process as in Example 1 except that the amount of the paste for water-holding layer applied to water-repellent carbon paper (TGP60; manufactured by Toray Industries, Inc.) was 0.4 mg/cm$^2$, which was larger than that applied in Example 1.

EXAMPLE 3

A single cell was fabricated by the same process as in Example 1 except that the amount of the paste for water-holding layer applied to water-repellent carbon paper (TGP60; manufactured by Toray Industries. Inc.) was 0.2 mg/cm$^2$, which was smaller than that applied in Example 1.

COMPARATIVE EXAMPLE 1

A single cell was fabricated by the same process as in Example 1 except that the amount of the crystalline carbon fiber added to the water-holding layer was 3.5 g, which was larger than that applied in Example 1.

COMPARATIVE EXAMPLE 2

A single cell was fabricated by the same process as in Example 1 except that the amount of the crystalline carbon fiber added to the water-holding layer was 0 g, i.e. no crystalline carbon fiber was added.

COMPARATIVE EXAMPLE 3

A single cell was fabricated by the same process as in Example 1 except that the water-holding layer as in Example 1 was not applied, but only the paste for water-repellent layer was applied.

COMPARATIVE EXAMPLE 4

A single cell was fabricated by the same process as in Example 1 except that neither the paste for water-holding layer nor the paste for water-repellent layer as in Example 1 was applied, but only carbon paper (TGPO60; manufactured by Toray Industries, Inc.) rendered water repellent in advance as in Example 1 was used as the gas diffusion layer for forming a membrane electrode assembly.

COMPARATIVE EXAMPLE 5

A single cell was fabricated by the same process as in Example 1 except that pressure for hot pressing the electrode sheet to the solid polymer membrane was

COMPARATIVE EXAMPLE 6

A single cell was fabricated by the same process as in Example 1 except that pressure for hot pressing the electrode sheet to the solid polymer membrane was 30 kg/cm$^2$.

Results of measurement of power generation performance with relative humidity varied in reactant gases supplied to single cells of Examples 1-3 and Comparative examples 1-4 are shown in FIGS. 7A and 7B. The conditions of operation were as follows: (1) fuel gases and oxidant gases were humidified at the same relative humidity; (2) operating temperature was maintained at 75° C.; (3) pressure of gases supplied to the electrodes (fuel-gas terminal and oxidant-gas terminal) were both 200 kPa; and (4) terminal voltages were measured with current density of the electrodes of the cell at 1 A/cm$^2$. The results can be evaluated as follows:

(1) With the cells in Examples 1-3, desirable terminal voltages which were higher than 0.6V were observed. The moisture contents of the gas diffusion layers were within the range of 48.6-90.4 mass %; it is thus evaluated that the power generation performance was stably maintained at a sufficient level irrespective of humidity of the supplied reactant gases. It turned out that provision of the water-holding layer and the water-repellent layer serve to produce a desirable level of power generation performance (i.e., 0.6 V or higher) irrespective of humidity of the reactant gases.

(2) Comparative Example 1 used a single cell including a water-holding layer containing 0.4 mg/cm² of crystalline carbon fibers the amount of which was larger than Example 1, and a water-repellent layer. As shown in FIG. 7B, if the relative humidity of the reactant gases is 40% or higher, the terminal voltage can fall within a desirable range of 0.6V or higher.

(3) Comparative Example 2 used a single cell including a water-holding layer containing 0 g of crystalline carbon fibers the amount of which was smaller than Example 1, and a water-repellent layer. As shown in FIG. 7B, if the relative humidity of the reactant gases is lower than 40%, the power generation performance exhibits an excellent level, but if the relative humidity of the reactant gases is 60% or higher, the power generation performance becomes insufficient, because water cannot properly be drained out of the water-holding layer, contrary to Comparative Example 1.

(4) Comparative Example 3 used a single cell including no water-holding layer bat a water-repellent layer. As shown in FIG. 7B, unless the relative humidity is high, a desirable level of the terminal voltage, i.e., 0.6V or higher, cannot be obtained.

(5) Comparative Example 4 used a single cell including neither water-holding layer nor water-repellent layer but with only carbon paper rendered water repellent in advance used as a gas diffusion layer. As shown in FIG. 7B. Comparative Example 4 is most susceptible to the change in relative humidity among the comparative examples. The terminal voltage cannot reach a desirable level, i.e., 0.6V or higher, unless the relative humidity is as high as 100%, as in Comparative Example 3.

Next, results of measurement of differences of terminal voltages ("Δ terminal voltage") before and after the 200-hour endurance test carried out in a manner as described above using single cells of Examples 1-3 and Comparative Examples 1-6 will be explained with reference to FIG. 7C. The conditions of operation were substantially the same as above results of measurement described with reference to FIGS. 7A and 7B. The results can be evaluated as follows:

(6) The cells of Examples 1-3 exhibited a sufficiently low level of Δ terminal voltages, and the power generation performance was not affected by the 200-hour endurance test.

(7) The cells of Comparative Examples 1-4 prepared with the differential pressures outside the desirable range defined by the present invention exhibited a higher level of Δ terminal voltages beyond a desirable range defined by the present invention. Therefore, it turned out that the performances of the cells were affected badly by the improper differential pressure.

(8) The cells of Comparative Examples 5 and 6 prepared with the adhesion rates outside the desirable range defined by the present invention exhibited a higher level of Δ terminal voltages beyond a desirable range defined by the present invention. Therefore, it turned out that the performances of the cells were affected badly by the endurance test.

Although the preferred embodiments of the present invention have been described above, the present invention is not limited to the above exemplified embodiments, and various modifications and changes may be made in the present invention without departing from the spirit and scope thereof.

What is claimed is:

1. An electrode for a solid polymer fuel cell, comprising:
   a gas diffusion layer for uniformly diffusing reactant gases;
   an electrode catalyst layer disposed between a solid polymer membrane of the fuel cell and the gas diffusion layer to support a catalyst for reaction of the diffused reactant gases; and
   a water-holding layer disposed between the gas diffusion layer and the electrode catalyst layer to enhance a water-retaining capability of the gas diffusion layer,
   wherein the electrode catalyst layer is made porous to facilitate drainage of water from the electrode catalyst layer; and
   wherein the electrode catalyst layer includes a catalyst, a carbon powder for supporting the catalyst, an ion conductive polymer, and a crystalline carbon fiber; and
   wherein the gas diffusion layer includes, in sequence from an eletrode catalyst layer side: a water-repellent layer containing an ion conductive polymer, a carbon powder, and a crystalline carbon fiber; and a carbon cloth layer.

2. An electrode according to claim 1, wherein the gas diffusion layer has a moisture content ranging between 50% and 90% inclusive, the moisture content being obtained by an equation:

$$MoistureContent = \frac{SM - DM}{DM} \times 100 [\%]$$

where SM denotes mass of the gas diffusion layer under saturation of water vapor pressure; and DM denotes mass of the gas diffusion layer under dry conditions.

3. An electrode according to claim 1, fiber including a water-repellent layer provided between the water-holding layer and the gas diffusion layer to facilitate drainage of water from the gas diffusion layer.

4. A membrane electrode assembly for a solid polymer fuel cell comprising:
   a pair of electrodes; and
   a solid polymer membrane disposed between the electrodes, wherein at least one of the electrodes includes:
   a gas diffusion layer for uniformly diffusing reactant gases;
   an electrode catalyst layer disposed between the solid polymer membrane and the gas diffusion layer to support a catalyst for reaction of the diffused reactant gases; and
   a water-holding layer disposed between the gas diffusion layer and the electrode catalyst layer to enhance a water-retaining capability of the gas diffusion layer,
   wherein the electrode catalyst layer is made porous to facilitate drainage of water from the electrode catalyst layer; and
   wherein the electrode catalyst layer includes a catalyst, a carbon powder for supporting the catalyst, an ion conductive polymer, and a crystalline carbon fiber; and
   wherein the gas diffused layer includes, in sequence from an electrode catalyst layer side: a water-repellent layer containing an ion conductive polymer, a carbon powder, and a crysalline carbon fiber; and a carbon cloth layer.

5. A membrane electrode assembly according to claim 4, wherein the gas diffusion layer has a moisture content ranging between 50% and 90% inclusive, the moisture content being obtained by an equation:

$$MoistureContent = \frac{SM - DM}{DM} \times 100[\%]$$

where SM denotes mass of the gas diffusion layer under saturation of water vapor pressure; and DM denotes mass of the gas diffusion layer under dry conditions.

6. A membrane electrode assembly according to claim 4, further including a water-repellent layer provided between the water-holding layer and the gas diffusion layer to facilitate drainage of water from the gas diffusion layer.

7. A membrane electrode assembly according to claim 4, a percentage of a charge amount of catalytic substances existing on an interface between the solid polymer membrane and the electrode catalyst layer to a charge amount of all catalytic substances existing in the electrode catalyst layer is 15% or greater, the charge amounts being determined by a cyclic voltammetry.

* * * * *